United States Patent
Pan

(10) Patent No.: US 9,191,980 B2
(45) Date of Patent: *Nov. 17, 2015

(54) SYSTEM AND METHOD TO CONTROL WIRELESS COMMUNICATIONS

(75) Inventor: Shaowei Pan, Kildeer, IL (US)

(73) Assignee: Lemko Corporation, Itasca, IL (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/235,021

(22) Filed: Sep. 16, 2011

(65) Prior Publication Data

US 2012/0002607 A1 Jan. 5, 2012

Related U.S. Application Data

(63) Continuation of application No. 12/108,209, filed on Apr. 23, 2008, now Pat. No. 8,046,420.

(51) Int. Cl.
| | |
|---|---|
| *H04W 76/02* | (2009.01) |
| *H04W 88/10* | (2009.01) |
| *H04W 88/16* | (2009.01) |
| *H04L 29/06* | (2006.01) |

(52) U.S. Cl.
CPC ......... *H04W 76/022* (2013.01); *H04L 65/1036* (2013.01); *H04W 88/10* (2013.01); *H04W 88/16* (2013.01)

(58) Field of Classification Search
CPC ... H04L 12/66; H04L 65/1036; H04W 88/10; H04W 88/16
USPC .......... 709/217, 218, 212; 707/748; 370/352, 370/401; 455/433
See application file for complete search history.

(56) References Cited

U.S. PATENT DOCUMENTS

| | | | |
|---|---|---|---|
| 4,284,848 | A | 8/1981 | Frost |
| 5,590,175 | A | 12/1996 | Gallant et al. |
| 5,623,495 | A | 4/1997 | Eng et al. |
| 5,623,532 | A | 4/1997 | Houde et al. |
| 5,713,073 | A | 1/1998 | Warsta |
| 5,734,979 | A | 3/1998 | Lu et al. |
| 5,890,064 | A | 3/1999 | Widergen et al. |
| 5,933,784 | A | 8/1999 | Gallagher et al. |

(Continued)

FOREIGN PATENT DOCUMENTS

| | | |
|---|---|---|
| CN | 1427637 A | 7/2003 |
| EP | 0365885 A2 | 5/1990 |
| WO | 2007102003 A1 | 9/2007 |

OTHER PUBLICATIONS

Pan, U.S. Appl. No. 13/309,003; "Providing Communications Using a Distributed Mobile Architecture"; filed Dec. 20, 2011.

(Continued)

*Primary Examiner* — Thu Ha Nguyen
(74) *Attorney, Agent, or Firm* — Toler Law Group, P.C.

(57) ABSTRACT

A method of controlling wireless communications is provided. A call is received from a first mobile device at a base transceiver station (BTS) interface of a first distributed mobile architecture (DMA) server. The call is associated with a destination device. The first DMA server determines that a first distributed mobile architecture gateway (DMAG) supports communication with the destination device based on registration data stored at the first DMA server. Voice information associated with the call is converted to packet data. The packet data is routed to the destination device via the first DMAG.

20 Claims, 7 Drawing Sheets

(56) References Cited

U.S. PATENT DOCUMENTS

| | | |
|---|---|---|
| 5,991,639 A | 11/1999 | Rautiola et al. |
| 6,122,499 A | 9/2000 | Magnusson |
| 6,131,038 A | 10/2000 | Sekine et al. |
| 6,141,564 A | 10/2000 | Bruner et al. |
| 6,160,804 A | 12/2000 | Ahmed et al. |
| 6,411,825 B1 | 6/2002 | Csapo et al. |
| 6,418,308 B1 | 7/2002 | Heinonen et al. |
| 6,421,325 B1 | 7/2002 | Kikinis |
| 6,515,985 B2 | 2/2003 | Shmulevich et al. |
| 6,539,237 B1 | 3/2003 | Sayers et al. |
| 6,542,497 B1 | 4/2003 | Curry et al. |
| 6,549,937 B1* | 4/2003 | Auerbach et al. ............ 709/206 |
| 6,584,098 B1 | 6/2003 | Dutnall |
| 6,611,533 B1 | 8/2003 | Liao et al. |
| 6,614,784 B1 | 9/2003 | Glitho et al. |
| 6,631,260 B1 | 10/2003 | Carey et al. |
| 6,647,426 B2 | 11/2003 | Mohammed |
| 6,678,155 B1 | 1/2004 | Bresniker |
| 6,694,134 B1 | 2/2004 | Lu et al. |
| 6,697,355 B1 | 2/2004 | Lim |
| 6,704,409 B1 | 3/2004 | Dilip et al. |
| 6,731,932 B1 | 5/2004 | Rune et al. |
| 6,735,184 B1 | 5/2004 | Davidson et al. |
| 6,751,207 B1 | 6/2004 | Lee et al. |
| 6,760,325 B1 | 7/2004 | Hameleers et al. |
| 6,763,226 B1 | 7/2004 | McZeal, Jr. |
| 6,763,233 B2 | 7/2004 | Bharatia |
| 6,791,988 B1 | 9/2004 | Hameleers et al. |
| 6,795,444 B1 | 9/2004 | Vo et al. |
| 6,807,431 B2 | 10/2004 | Sayers et al. |
| 6,807,432 B2 | 10/2004 | Hwang |
| 6,816,706 B1 | 11/2004 | Hohnstein et al. |
| 6,819,652 B1 | 11/2004 | Akhtar et al. |
| 6,829,473 B2 | 12/2004 | Raman et al. |
| 6,831,903 B2 | 12/2004 | Kang |
| 6,839,356 B2 | 1/2005 | Barany et al. |
| 6,859,652 B2 | 2/2005 | Karabinis et al. |
| 6,871,072 B1 | 3/2005 | Meche |
| 6,879,582 B1 | 4/2005 | Dhara et al. |
| 6,879,677 B2 | 4/2005 | Trandal et al. |
| 6,917,813 B2 | 7/2005 | Elizondo |
| 6,937,708 B2 | 8/2005 | Hirose |
| 6,958,983 B2 | 10/2005 | Musikka et al. |
| 6,985,454 B1 | 1/2006 | Wiedeman et al. |
| 7,003,286 B2* | 2/2006 | Brown et al. ............ 455/416 |
| 7,050,414 B2 | 5/2006 | Lin |
| 7,054,307 B2 | 5/2006 | Papadimitriou et al. |
| 7,054,322 B2 | 5/2006 | D'Annunzio et al. |
| 7,072,650 B2 | 7/2006 | Stanforth |
| 7,117,015 B2 | 10/2006 | Scheinert et al. |
| 7,120,435 B2 | 10/2006 | Usher et al. |
| 7,120,436 B2 | 10/2006 | Kim |
| 7,133,670 B1 | 11/2006 | Moll et al. |
| 7,133,923 B2 | 11/2006 | MeLampy et al. |
| 7,136,651 B2 | 11/2006 | Kalavade |
| 7,154,901 B2 | 12/2006 | Chava et al. |
| 7,158,621 B2 | 1/2007 | Bayne |
| 7,171,216 B1 | 1/2007 | Choksi |
| 7,299,039 B2 | 11/2007 | Lee et al. |
| 7,313,399 B2 | 12/2007 | Rhee et al. |
| 7,324,478 B2 | 1/2008 | Park et al. |
| 7,328,268 B1 | 2/2008 | Foltak et al. |
| 7,345,997 B2 | 3/2008 | Kim |
| 7,346,334 B2 | 3/2008 | Gaeta et al. |
| 7,349,412 B1 | 3/2008 | Jones et al. |
| 7,359,700 B2 | 4/2008 | Swenson et al. |
| 7,383,042 B2 | 6/2008 | Lamb et al. |
| 7,385,947 B2 | 6/2008 | Wu et al. |
| 7,406,069 B2 | 7/2008 | Yashar et al. |
| 7,424,313 B2 | 9/2008 | Ham et al. |
| 7,486,967 B2 | 2/2009 | Pan et al. |
| 7,490,132 B1* | 2/2009 | Lyle et al. ............ 709/207 |
| 7,522,632 B2* | 4/2009 | La Porta et al. ............ 370/466 |
| 7,536,170 B2 | 5/2009 | Goldman et al. |
| 7,539,158 B2 | 5/2009 | Pan |
| 7,548,763 B2 | 6/2009 | Pan |
| 7,552,670 B2 | 6/2009 | Goldman et al. |
| 7,606,594 B2 | 10/2009 | Jesse et al. |
| 7,653,414 B2 | 1/2010 | Pan |
| 7,738,488 B2 | 6/2010 | Marsico et al. |
| 7,760,695 B2 | 7/2010 | Gopalakrishnan et al. |
| 7,787,879 B1 | 8/2010 | Philips et al. |
| 7,840,230 B2 | 11/2010 | Pan |
| 7,855,988 B2 | 12/2010 | Pan |
| 7,856,233 B2 | 12/2010 | Pan |
| 7,979,066 B2 | 7/2011 | Pan |
| 8,018,907 B2 | 9/2011 | Kubler et al. |
| 8,036,158 B2 | 10/2011 | Pan et al. |
| 8,046,420 B2 | 10/2011 | Pan |
| 8,086,536 B2* | 12/2011 | Dublish et al. ............ 705/57 |
| 8,089,920 B2 | 1/2012 | Pan |
| 8,107,409 B2 | 1/2012 | Pan |
| 8,213,909 B2 | 7/2012 | Lee et al. |
| 8,224,322 B2 | 7/2012 | Pan |
| 8,310,990 B2 | 11/2012 | Pan |
| 8,340,667 B2 | 12/2012 | Pan |
| 8,351,420 B2* | 1/2013 | Linkola et al. ............ 370/352 |
| 8,359,029 B2 | 1/2013 | Pan |
| 8,676,155 B2* | 3/2014 | Fan et al. ............ 455/406 |
| 8,717,009 B2* | 5/2014 | Tu ............ 324/202 |
| 2001/0013050 A1* | 8/2001 | Shah ............ 709/202 |
| 2001/0036173 A1 | 11/2001 | Shmulevich et al. |
| 2001/0046859 A1 | 11/2001 | Kil |
| 2001/0055298 A1 | 12/2001 | Baker et al. |
| 2002/0009060 A1 | 1/2002 | Gross |
| 2002/0015392 A1 | 2/2002 | Musikka et al. |
| 2002/0016180 A1 | 2/2002 | Derosier et al. |
| 2010/0048208 A9 | 2/2002 | Gunaratnam et al. |
| 2002/0045444 A1 | 4/2002 | Usher et al. |
| 2002/0051518 A1* | 5/2002 | Bondy et al. ............ 379/35 |
| 2002/0058502 A1 | 5/2002 | Stanforth |
| 2002/0061746 A1 | 5/2002 | Jo et al. |
| 2002/0160772 A1 | 10/2002 | Gailey et al. |
| 2002/0169887 A1 | 11/2002 | MeLampy et al. |
| 2003/0048766 A1 | 3/2003 | D'Annunzio et al. |
| 2003/0063721 A1 | 4/2003 | Hirose |
| 2003/0088698 A1 | 5/2003 | Singh et al. |
| 2003/0092441 A1 | 5/2003 | Taha et al. |
| 2003/0096628 A1 | 5/2003 | Bar-On et al. |
| 2003/0100302 A1 | 5/2003 | Armbruster et al. |
| 2003/0100342 A1 | 5/2003 | Ham et al. |
| 2003/0112748 A1 | 6/2003 | Puppa et al. |
| 2003/0153343 A1 | 8/2003 | Crockett et al. |
| 2003/0154306 A1 | 8/2003 | Perry |
| 2003/0186694 A1 | 10/2003 | Sayers et al. |
| 2003/0198325 A1 | 10/2003 | Bayne |
| 2004/0014466 A1 | 1/2004 | Jesse et al. |
| 2004/0018829 A1 | 1/2004 | Raman et al. |
| 2004/0019539 A1 | 1/2004 | Raman et al. |
| 2004/0156495 A1* | 8/2004 | Chava et al. ............ 379/392 |
| 2004/0203621 A1* | 10/2004 | Brown et al. ............ 455/412.1 |
| 2004/0203677 A1* | 10/2004 | Brown et al. ............ 455/416 |
| 2004/0204097 A1 | 10/2004 | Scheinert et al. |
| 2004/0253949 A1 | 12/2004 | Swensen et al. |
| 2004/0253984 A1 | 12/2004 | Csapo et al. |
| 2004/0259556 A1 | 12/2004 | Czys |
| 2005/0044152 A1* | 2/2005 | Hardy et al. ............ 709/206 |
| 2005/0064922 A1 | 3/2005 | Owens et al. |
| 2005/0070278 A1 | 3/2005 | Jiang |
| 2005/0075106 A1 | 4/2005 | Jiang |
| 2005/0091392 A1 | 4/2005 | Gesswein et al. |
| 2005/0176413 A1 | 8/2005 | Lee et al. |
| 2005/0220054 A1 | 10/2005 | Meier et al. |
| 2005/0249176 A1 | 11/2005 | O'Neil et al. |
| 2005/0250491 A1* | 11/2005 | Roy ............ 455/428 |
| 2006/0026252 A1* | 2/2006 | Caspi et al. ............ 709/207 |
| 2006/0046714 A1 | 3/2006 | Kalavade ............ 455/428 |
| 2006/0046760 A1 | 3/2006 | Bertino et al. |
| 2006/0047836 A1 | 3/2006 | Rao et al. |
| 2006/0052113 A1* | 3/2006 | Ophir et al. ............ 455/456.1 |
| 2006/0063544 A1 | 3/2006 | Zhao et al. |
| 2006/0098661 A1 | 5/2006 | Pan |
| 2006/0114934 A1 | 6/2006 | Shin et al. |
| 2006/0141984 A1 | 6/2006 | Taglienti et al. |

(56) References Cited

U.S. PATENT DOCUMENTS

| | | |
|---|---|---|
| 2006/0142011 A1 | 6/2006 | Kallio |
| 2006/0148465 A1 | 7/2006 | Perdomo et al. |
| 2006/0159039 A1 | 7/2006 | Jung et al. |
| 2006/0203746 A1 | 9/2006 | Maggenti et al. |
| 2006/0217121 A1 | 9/2006 | Soliman et al. |
| 2006/0221912 A1 | 10/2006 | Olivier et al. |
| 2006/0234747 A1 | 10/2006 | Pan |
| 2006/0234774 A1 | 10/2006 | Pan et al. |
| 2006/0258358 A1 | 11/2006 | Kallio |
| 2007/0008968 A1 | 1/2007 | Baker et al. |
| 2007/0010245 A1 | 1/2007 | Levitan |
| 2007/0021097 A1 | 1/2007 | Gaeta et al. |
| 2007/0021118 A1 | 1/2007 | Ophir |
| 2007/0060124 A1* | 3/2007 | Kalavade ............... 455/433 |
| 2007/0076697 A1* | 4/2007 | Huotari et al. ............. 370/352 |
| 2007/0082684 A1 | 4/2007 | Rozenstrauch et al. |
| 2007/0087738 A1 | 4/2007 | Melkesetian |
| 2007/0127423 A1 | 6/2007 | Ho |
| 2007/0147598 A1 | 6/2007 | Somes et al. |
| 2007/0197215 A1 | 8/2007 | Ben-Yehuda et al. |
| 2007/0202847 A1 | 8/2007 | Pan |
| 2007/0213075 A1 | 9/2007 | Jiang |
| 2007/0230352 A1 | 10/2007 | Kokku et al. |
| 2007/0232267 A1 | 10/2007 | Pan |
| 2007/0232304 A1 | 10/2007 | Goldman et al. |
| 2007/0234892 A1 | 10/2007 | Goldman et al. |
| 2007/0243891 A1* | 10/2007 | Civanlar et al. ............. 455/466 |
| 2007/0271606 A1* | 11/2007 | Amann et al. ............. 726/15 |
| 2007/0287452 A1 | 12/2007 | Pan |
| 2007/0291910 A1* | 12/2007 | Bucchieri et al. ......... 379/88.06 |
| 2007/0293216 A1* | 12/2007 | Jiang ............... 455/433 |
| 2008/0013531 A1 | 1/2008 | Elliott et al. |
| 2008/0039144 A1 | 2/2008 | Pan et al. |
| 2008/0080438 A1 | 4/2008 | Gopalakrishnan et al. |
| 2008/0101314 A1 | 5/2008 | Bachmutsky |
| 2008/0101410 A1* | 5/2008 | Barkley et al. ............. 370/473 |
| 2008/0134295 A1* | 6/2008 | Bailey et al. ............. 726/4 |
| 2008/0146158 A1 | 6/2008 | Pan et al. |
| 2008/0160997 A1 | 7/2008 | Kim |
| 2008/0168523 A1* | 7/2008 | Ansari et al. ............. 725/131 |
| 2008/0244014 A1* | 10/2008 | Britton et al. ............. 709/206 |
| 2008/0261580 A1 | 10/2008 | Wallentin et al. |
| 2009/0003269 A1 | 1/2009 | Kumazawa et al. |
| 2009/0022155 A1 | 1/2009 | Rosenberg et al. |
| 2009/0031244 A1* | 1/2009 | Brezina et al. ............. 715/781 |
| 2009/0067441 A1* | 3/2009 | Ansari et al. ............. 370/401 |
| 2009/0156213 A1* | 6/2009 | Spinelli et al. ............. 455/436 |
| 2009/0186626 A1 | 7/2009 | Raghothaman |
| 2009/0215449 A1 | 8/2009 | Avner |
| 2009/0227230 A1 | 9/2009 | Camilleri et al. |
| 2009/0227235 A1 | 9/2009 | Pan |
| 2009/0228555 A1* | 9/2009 | Joviak et al. ............. 709/205 |
| 2009/0270097 A1* | 10/2009 | Gallagher et al. ......... 455/435.1 |
| 2009/0271491 A1 | 10/2009 | Pan |
| 2009/0292785 A1* | 11/2009 | Leedberg et al. ........... 709/206 |
| 2009/0325584 A1 | 12/2009 | Pan |
| 2009/0327819 A1 | 12/2009 | Pan |
| 2010/0008306 A1 | 1/2010 | Pan |
| 2010/0008369 A1 | 1/2010 | Pan |
| 2010/0048197 A1 | 2/2010 | Jiang |
| 2010/0057485 A1 | 3/2010 | Luft |
| 2010/0057732 A1* | 3/2010 | O'Sullivan et al. ............. 707/6 |
| 2010/0075668 A1 | 3/2010 | Pan |
| 2010/0080214 A1* | 4/2010 | Li et al. ............. 370/352 |
| 2010/0094878 A1* | 4/2010 | Soroca et al. ............. 707/748 |
| 2010/0199340 A1* | 8/2010 | Jonas et al. ............. 726/8 |
| 2010/0217809 A1* | 8/2010 | Vymenets et al. ............. 709/206 |
| 2010/0217837 A1* | 8/2010 | Ansari et al. ............. 709/218 |
| 2011/0059740 A1 | 3/2011 | Pan |
| 2011/0060853 A1 | 3/2011 | Pan |
| 2011/0223921 A1 | 9/2011 | Pan et al. |
| 2011/0320576 A1* | 12/2011 | Lauer et al. ............. 709/220 |
| 2012/0002607 A1 | 1/2012 | Pan |
| 2012/0020293 A1* | 1/2012 | Nix et al. ............. 370/328 |
| 2012/0044908 A1* | 2/2012 | Spinelli et al. ............. 370/331 |
| 2012/0094659 A1 | 4/2012 | Pan |
| 2012/0106454 A1 | 5/2012 | Pan |
| 2012/0224586 A1 | 9/2012 | Nag et al. |
| 2012/0252444 A1 | 10/2012 | Pan |
| 2012/0324041 A1* | 12/2012 | Gerber et al. ............. 709/217 |
| 2013/0039279 A1 | 2/2013 | Pan |
| 2013/0130677 A1 | 5/2013 | Pan |
| 2013/0148578 A1 | 6/2013 | Pan |
| 2015/0081812 A1* | 3/2015 | Davies et al. ............. 709/206 |

OTHER PUBLICATIONS

B.G. Evans and K. Baughan; "Visions of 4G"; Electronics & Communication Engineering Journal; Dec. 2000; pp. 293-303.

Shirshanka Das, Alok Nandan & Giovanni Pau (University of CA, Los Angeles, CA, USA); "SPAWN: A Swarming Protocol for Vehicular Ad-Hoc Wireless Networks"; VANET'04, Oct. 1, 2004, Philadelphia, PA, USA; ACM 1-58113-922-5/04/0010; 2 pgs.

Yu-Chee Tseng, Chia-Ching Shen (National Chiao Tung University) & Wen-Tsuen Chen (National Tsing Hua University); "Integrating Mobile IP with AD Hoc Networks"; IEEE Computer Society; 0018-9162/03; 2003 IEEE; May 2003; pp. 48-55.

Halim Yanikomeroglu, David D. Falconer & Van M. Sreng; "Coverage Enhancement Through Two-Hop Peer-to-Peer Relaying in Cellular Radio Networks"; Broadband Communications and Wireless Systems (BCWS) Centre Department of Systems & Computer Engineering, Carleton University, Ottawa, Canada; WWRF Meeting #7, Eindhoven, the Netherlands, Dec. 3-4, 2002, WG4: Spectrum, New Air Interfaces and Ad-Hoc Networking Multi-Hop Wireless Systems; 10 pages.

Bur Goode; "Voice Over Internet Protocol (VoIP)"; 0018-9219/02 2002 IEEE; Proceedings of the IEEE; vol. 90, No. 9, Sep. 2002; pp. 1495-1517.

Kyung-Hyu Lee, Kyu-Ok Lee & Kwon-Chul Park (Network Research Laboratory ETRI Korea) Jong-Ok Lee and Yoon-Hak Bang (Network Planning Team KT Korea); "Architecture to be Deployed on Strategies of Next-Generation Networks"; 0-7803-7802-4/03 2003 IEEE; pp. 819-822.

Wolfgang Kellerer, Christian Bettstetter, Christian Schwingenschlögl & Peter Sties (Technische Universität München) Karl-Ernst Steinberg (BMW) & Hans-Jörg Vögel (the Fantastic Corp); "(Auto) Mobile Communication in a Heterogeneous and Converged World"; IEEE Personal Communications; Dec. 2001; 1070-9916/01; 2001 IEEE pp. 41-47.

Nilanjan Banerjee & Sajal K. Das (University of Texas, Arlington) & Arup Acharya (IBM T.J. Watson Research Center) "Peer-to-peer SIP-based Services over Wireless Ad Hoc Networks"; BROADWIM: Broadband Wireless Multimedia Workshop; Oct. 29, 2004—broadnets.org; *This work was supported by NSF under the ORBIT testbed project, grant # NSF NRT Project #ANI-0335244 and by NSF ITR grant IIS-0326505; 8 pages.

Hung-Yu Wei (Columbia University) & Richard D. Gitlin (NEC Laboratories America); "Two-Hop-Relay Architecture for Next-Generation WWAN/WLAN Integration"; 4G Mobile Communications: Toward Open Wireless Architecture; 1536-1284/04 2004 IEEE; IEEE Wireless Communications; Apr. 2004; pp. 2-9.

Wolfgang Kellerer (LKN, Munich University of Technology), Hans-Jörg Vögel (the Fantastic Corp.) & Karl-Ernst Steinberg (BMW); "A Communication Gateway for Infrastructure Independent Wireless Access"; IEEE Communications Magazine; Mar. 2002; vol. 9; No. 3; 6 pages.

Willie W. Lu & Jenny Hu (U.S. Center for Wireless Communications, Stanford University, CA); "Open Wireless Architecture—The Core to 4G Mobile Communications"; China Communications; Apr. 2006; pp. 32-39.

Ralf Pabst, Bernard H. Walke & Daniel C. Schultz (RWTH Aachen University) Patrick Herhold & Gerhard P. Fettweis (Technical University of Dresden) Halim Yanikomeroglu & David D. Falconer (Carleton University) Sayandev Mukherjee & Harish Viswanathan (Lucent Technologies) Matthias Lott & Wolfgang Zirwas (Siemens ICM) Mischa Dohler & Hamid Aghvami (Kings College); "Relay-Based Deployment Concepts for Wireless and Mobile Broadband Radio"; 0163-6804/04; 2004 IEEE; IEEE Communications Magazine; Sep. 2004; pp. 80-89.

(56) References Cited

OTHER PUBLICATIONS

Simone Frattasi, Hanane Fathi, Frank H.P. Fitzek & Ramjee Prasad (Aalborg University) Marcos D. Katz (Samsung Electronics); "Defining 4G Technology from the User's Perspective"; IEEE Network; Jan./Feb. 2006; 0890-8044/06; 2006 IEEE; pp. 35-41.

Ian F. Akyildiz (Broadband and Wireless Networking BWN Lab, Georgia Institute of Technology) Xudong Wang & Weilin Wang (Kiyon, Inc. La Jolla, CA); "Wireless Mesh Networks: A Survey"; Computer Networks 47; Jan. 1, 2005; pp. 445-487; 1389-1286 2004 Elsevier B.V.

Brian Woerner (Virginia Tech, Blacksburg, VA) & Mostofa Howlader (University of Tennessee, Knoxville, TN); "Research Directions for Fourth Generation Wireless"; Proceedings of the 10th IEEE International Workshops on Enabling Technologies: Infrastructure for Collaborative Enterprises (WETICE 2001); Jun. 20-22, 2001; Cambridge, MA, USA; IEEE Computer Society 2001; ISBN 0-7695-1269-0; 2 pages.

"Framework and Overall Objectives of the Future Development of IMT-2000 and Systems Beyond IMT-2000"; International Telecommunication Union; ITU-R Radiocommunication Sector of ITU; Recommendation ITU-R M.1645 (Jun. 2003); M Series; Mobile, Radiodetermination, Amateur and Related Satellite Services; 26 pages.

Hoffpauir et al., United States Statutory Invention Registration No. H1,918 published Nov. 7, 2000, 19 pages.

Notice to File Corrected Application Papers for U.S. Appl. No. 12/108,209 received from the United States Patent and Trademark Office (USPTO) dated May 9, 2008, 2 pages.

Non-Final Ofice Action for U.S. Appl. No. 12/108,209 received from the United States Patent and Trademark Office (USPTO) dated Dec. 23, 2010, 16 pages.

Notice of Allowance and Fee(s) Due for U.S. Appl. No. 12/108,209 received from the United States Patent and Trademark Office (USPTO) dated Jun. 23, 2011, 17 pages.

Extended European Search Report for European Application No. 05801092.7-1525/1810465, PCT/US05/035648 mailed Jan. 31, 2011, 72 pages.

First Examination Report for Indian Application No. 469/MUMNP/2007, dated Mar. 30, 2013, 4 pages.

International Report on Patentability and Written Opinion of the International Search Authority for International Application No. PCT/US05/35648 from the International Searching Authority, mailed on Aug. 24, 2006, 8 pages.

International Search Report and Written Opinion of the International Search Authority for International Application No. PCT/US09/045951 from the International Searching Authority, mailed on Dec. 30, 2009, 8 pages.

International Search Report and Written Opinion of the International Search Authority for International Application No. PCT/US09/045957 from the International Searching Authority, mailed on Jan. 14, 2010, 8 pages.

International Search Report and Written Opinion of the International Search Authority for International Application No. PCT/US09/045968 from the International Searching Authority, mailed on Jan. 21, 2010, 9 pages.

International Search Report and Written Opinion of the International Search Authority for International Application No. PCT/US09/045973 from the International Searching Authority, mailed on Jan. 18, 2010, 10 pages.

Yu, W. et al., Abstract of "Reverse Link Capacity Analysis on Distributed Wireless Communication System", Journal of Beijing University of Posts and Telecommunications, 2004, Issue 3, Retrieved from <http://en.cnki.com.cn/article_en/CJFDTOTAL-BJYD200403020.htm>, 3 pages.

\* cited by examiner

| | 708 | 710 | 712 | 714 | 716 | 718 |
|---|---|---|---|---|---|---|
| | DMA Node Register | DMA Node HLR | DMA Node VLR | Visitor DMA Node Register | Visitor DMA Node HLR | Visitor DMA Node VLR |
| 702 | Home DMA Server Register | HLR of each DMA Server | VLR of each DMA server | Visitor DMA server Register | HLR of each visitor DMA server | VLR of each Visitor DMA server |
| 704 | DMA server Register of $2^{nd}$ DMAG | HLR of each DMA server of $2^{nd}$ DMAG | VLR of each DMA server of $2^{nd}$ DMAG | Visitor DMA server Register of $2^{nd}$ DMAG | HLR of each Visitor DMA server of $2^{nd}$ DMAG | VLR of each Visitor DMA server of $2^{nd}$ DMAG |
| 706 | DMA server Register of $3^{rd}$ DMAG | HLR of each DMA server of $3^{rd}$ DMAG | VLR of each DMA server of $3^{rd}$ DMAG | Visitor DMA server Register of $3^{rd}$ DMAG | HLR of each Visitor DMA server of $3^{rd}$ DMAG | VLR of each Visitor DMA server of $3^{rd}$ DMAG |

700

| | 728 | 730 | 732 | 734 | 736 | 738 |
|---|---|---|---|---|---|---|
| | DMA Node Register | DMA Node HLR | DMA Node VLR | Visitor DMA Node Register | Visitor DMA Node HLR | Visitor DMA Node VLR |
| 722 | Home DMA Server Register | HLR of each DMA Server | VLR of each DMA server | Visitor DMA server Register | HLR of each visitor DMA server | VLR of each Visitor DMA server |
| 724 | DMA server Register of $1^{st}$ DMAG | HLR of each DMA server of $1^{st}$ DMAG | VLR of each DMA server of $1^{st}$ DMAG | Visitor DMA server Register of $1^{st}$ DMAG | HLR of each Visitor DMA server of $1^{st}$ DMAG | VLR of each Visitor DMA server of $1^{st}$ DMAG |
| 726 | DMA server Register of $3^{rd}$ DMAG | HLR of each DMA server of $3^{rd}$ DMAG | VLR of each DMA server of $3^{rd}$ DMAG | Visitor DMA server Register of $3^{rd}$ DMAG | HLR of each Visitor DMA server of $3^{rd}$ DMAG | VLR of each Visitor DMA server of $3^{rd}$ DMAG |

SYSTEM AND METHOD TO CONTROL WIRELESS COMMUNICATIONS

CLAIM OF PRIORITY

The present application claims priority from and is a continuation of patent application Ser. No. 12/108,209 filed on Apr. 23, 2008 and entitled "SYSTEM AND METHOD TO CONTROL WIRELESS COMMUNICATIONS," the contents of which are expressly incorporated herein by reference in their entirety.

FIELD OF THE DISCLOSURE

The present disclosure relates generally to controlling wireless communications.

BACKGROUND

Access to telephony service is important for rural and isolated communities. However, while urban areas typically offer a variety of telephony services, such as landline, wireless, and broadband, rural areas often have limited or no telephony services. For example, many Asian countries have a penetration of four (4) telephone lines per one-hundred (100) inhabitants in urban areas, but a penetration of less than 0.2 per one-hundred (100) in rural areas. Access to telephony service is non-existent in some African countries and in some parts of Latin America.

Current telephone systems are expensive to deploy. For example, a typical cellular system requires a mobile switching center (MSC), a base station controller (BSC), and a home location register/visitor location register (HLR/VLR), collectively costing over two million dollars. Moreover, such a system requires a minimum of ten thousand users in order to be economically viable. Many rural areas lack a population large enough to support the installation of such a system. In addition, the environmental conditions in which the equipment, e.g., the MSC, BSC, and HLR/VLR, operates may be extremely harsh or cost-prohibitive to deploy. Alternatives, such as landline systems, are also expensive to deploy and face even more environmental restrictions.

BRIEF DESCRIPTION OF THE DRAWINGS

FIG. 7 is an illustrative embodiment of data associated with a distributed mobile architecture gateway (DMAG).

DETAILED DESCRIPTION OF THE DRAWINGS

A method includes receiving a call from a first mobile device at a base transceiver station (BTS) interface of a first distributed mobile architecture (DMA) server. The call is associated with a destination device. The method includes determining that determining that a first distributed mobile architecture gateway (DMAG) supports communication with the destination device based on registration data stored at the first DMA server. The method also includes converting voice information associated with the call to packet data. The method also includes routing the packet data to the destination device via the DMAG.

In another embodiment, a method includes receiving a call from a communication device at a distributed mobile architecture gateway (DMAG) via a network. The call is associated with a destination device. The method also includes determining that a first distributed mobile architecture (DMA) server supports wireless communication with the destination device based on registration data stored at the DMAG. The method also includes converting information associated with the call to packet data and routing the packet data to the destination device via the first DMA server.

In another embodiment, a computer-readable medium is disclosed. The computer-readable medium includes instructions executable by a processor. The computer-readable medium includes instructions to receive a call from a communication device at a distributed mobile architecture gateway (DMAG). The call is associated with a destination device. The computer-readable medium also includes instructions to determine that a first distributed mobile architecture (DMA) server supports communication with the destination device based on registration data stored at the DMAG. The computer-readable medium also includes instructions to convert information associated with the call to packet data to be routed to the destination device via the first DMA server.

Figure 1:
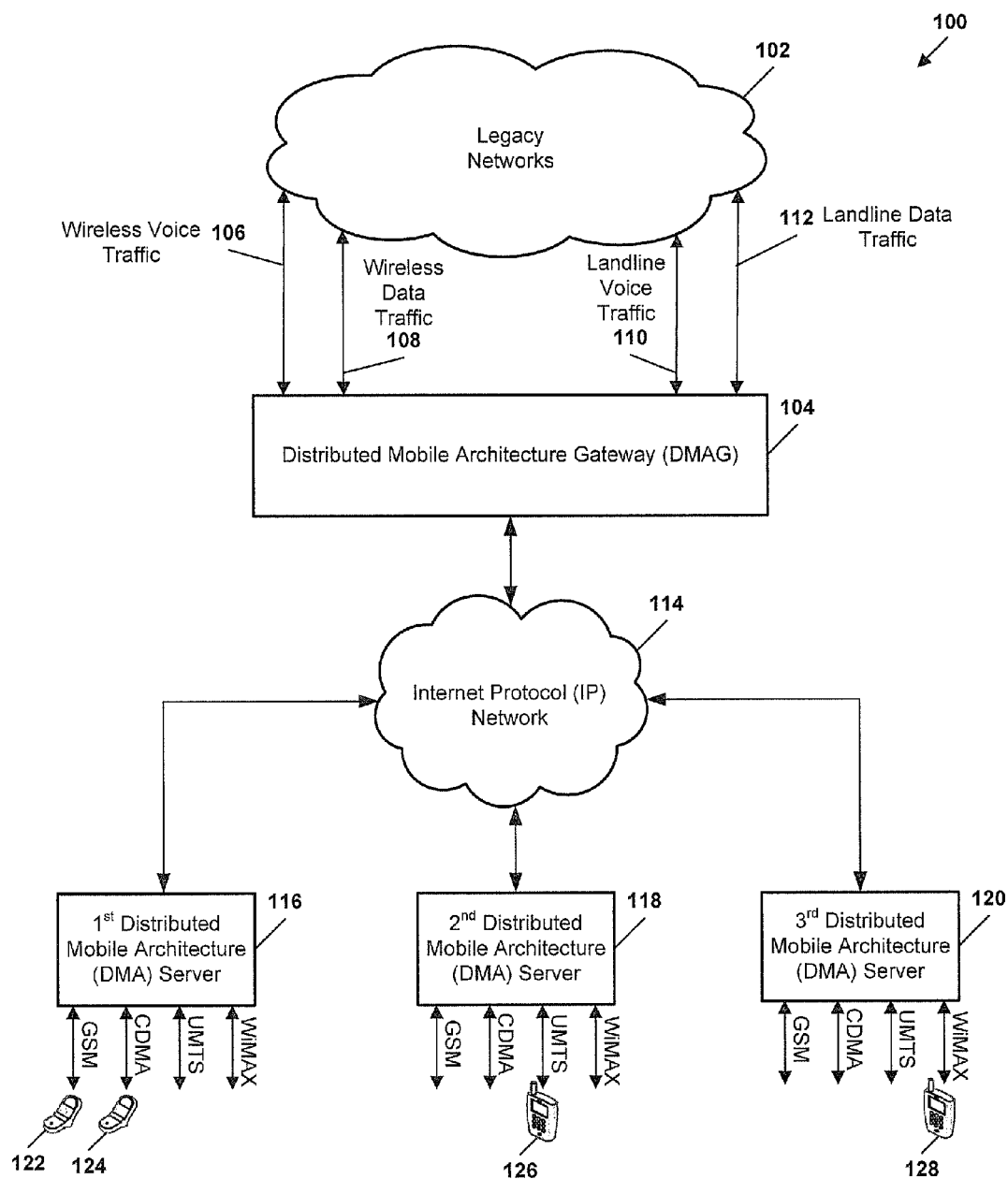
FIG. 1 is a block diagram of a first embodiment of a system to control wireless communications.

Referring to FIG. 1, a first embodiment of a system to control wireless communications is illustrated and generally designated 100. The system 100 includes one or more legacy networks 102 coupled to a distributed mobile architecture gateway (DMAG) 104. The one or more legacy networks 102 may include one or more wide-area wireless communication networks, one or more landline communication networks, one or more local area networks (LANs), one or more wireless local area networks (WLANs), or any combination thereof. The DMAG 104 may receive one or more types of traffic from the legacy networks 102. In FIG. 1, the DMAG 104 receives wireless voice traffic 106, wireless data traffic 108, landline voice traffic 110, landline data traffic 112, or any combination thereof from the legacy networks 102. The DMAG 104 routes voice traffic and data traffic between the one or more legacy networks 102 and one or more wireless communication devices via one or more distributed mobile architecture (DMA) servers, such as a first representative DMA server 116, a second representative DMA server 118, and a third representative DMA server 120. In FIG. 1, the DMAG 104 routes voice traffic and data traffic between the one or more legacy networks 102 and a first representative wireless communication device 122, a second representative wireless communication device 124, third representative wireless communication device 126, and a fourth representative wireless communication device 128.

The wireless voice traffic 106 may be carried over a Global System for Mobile Communications (GSM) network, a Code Division Multiple Access (CDMA) network, a Time Division Multiple Access (TDMA) network, a Universal Mobile Telecommunications System (UMTS) network, a Personal Communications Service (PCS) network, or any combination thereof. Signaling related to the wireless voice traffic 106 may be carried over a Signaling System 7 (SS7) network and may utilize an American National Standards Institute (ANSI) 41 protocol, a Mobile Application Part (MAP) protocol, or a Customized Application of Mobile Enhanced Logic (CAMEL) protocol. The wireless data traffic 108 may be carried over a General Packet Radio Service (GPRS) network, an enhanced GPRS (EGPRS) network, an IEEE 802.16 network, a UMTS network, a High Speed Packet Access (HSPA) network, or any combination thereof. The wireless data traffic 108 may be formatted according to Internet Protocol (IP). Additionally, wireless voice traffic may be carried over a wireless data traffic connection 108 using a mobile Voice over Internet Protocol (VoIP) technology.

One or more landline communication networks may carry voice traffic 110, data traffic 112, or any combination thereof. The one or more landline communication networks may carry landline voice traffic 110 over a Public Switched Telephone Network (PSTN), an Integrated Services Digital Network (ISDN), or any combination thereof. Signaling related to the landline voice traffic 110 may be carried over an SS7 network and may utilize an Integrated Service Digital Network User Part (ISUP) protocol. The landline data traffic 112 may be carried over a Digital Subscriber Line (DSL) network, an Asynchronous Transfer Mode (ATM) network, an optical fiber network, a coaxial cable network, or any combination thereof. Landline voice traffic may also be carried over a landline data traffic connection 112 using Voice over Internet Protocol (VoIP). The landline data traffic 112 may also be formatted according to Internet Protocol (IP).

The legacy networks 102 communicate the wireless voice traffic 106, the wireless data traffic 108, the landline voice traffic 110, the landline data traffic 112, or any combination thereof, to the DMAG 104. The DMAG 104 is adapted to route voice traffic and data traffic between the one or more legacy networks 102 and one or more wireless communication devices, such as the wireless communication devices 122, 124, 126 and 128 via a private Internet Protocol (IP) network 114. The private IP network 114 may include a landline IP network, a wireless IP network, or any combination thereof. For example, the DMAG 104 may route voice traffic and data traffic between the one or more legacy networks 102 and the first wireless communication device 122 and the second wireless communication device 124 via the first DMA server 116. The DMAG 104 may also route voice traffic and data traffic between the one or more legacy networks 102 and the third wireless communication device 126 via the second DMA server 118.

Additionally, the DMAG 104 may route voice traffic and data traffic between the wireless communication devices 122-128. For example, the DMAG 104 may route voice traffic and data traffic between wireless communication devices served by the same DMA server. Further, the DMAG 104 may route voice traffic and data traffic between wireless communication devices served by different DMA servers. In an illustrative example, the DMAG 104 may route voice traffic and data traffic between the third wireless communication device 126 and the fourth wireless communication device 128.

Each of the DMA servers 116-120 are adapted to route voice traffic, data traffic, or any combination thereof, related to wireless communication devices served by the respective DMA server. For example, the DMA servers 116-120 may be adapted to route voice traffic and data traffic between wireless communication devices served by the same DMA server. To illustrate, the first DMA server 116 may route voice traffic and data traffic between the first wireless communication device 122 and the second wireless communication device 124. Additionally, the DMA servers 116-120 may be adapted to route voice traffic and data traffic between the wireless communication devices 122-128 served by different DMA servers. For example, the first DMA server 116 and the third DMA server 120 may route voice traffic and data traffic between the first wireless communication device 122 and the third wireless communication device 126.

Each of the DMA servers 116-120 are adapted to send and receive voice and data traffic using more than one type of wireless protocol. For example, each of the DMA servers 116-120 may send and receive voice and data traffic using a Global System for Mobile (GSM) communications protocol, a Code Division Multiple Access (CDMA) protocol, a Universal Mobile Telephone System (UMTS) protocol, Worldwide Interoperability for Microwave Access (WiMAX) protocol, other wireless protocol, or any combination thereof.

In operation, each of the DMA servers 116-120 sends and receives voice and data traffic between at least two communications devices. When the same DMA server serves the communications devices, then the DMA server may route the call. Routing the call may include terminating the call at a destination communication device. The DMA server can support routing a call between different wireless technologies. For example, the first DMA server 116 may route a call from the first wireless communications device 122 to the second wireless communications device 124, where the first wireless communications device 122 uses the GSM protocol while the second wireless communications device 122 uses the CDMA protocol.

When two DMA servers serve two wireless communications devices, the call may be routed via an IP network or via a DMAG. In one illustrative embodiment, the first DMA server 116 may route a call originating at the first wireless communications device 122 to the fourth wireless communications device 128 via the IP network 114 and via the third DMA server 120. When the DMAG 104 services two or more DMA servers, such as the DMA servers 116-120, calls routed between the DMA servers 116-120 may be routed via the IP network 114 without involving the DMAG 104. When a call is routed between the DMA servers 116 and 120 and the DMAG 104 is not involved in routing the call, the routing is known as a peer-to-peer routing. In a second illustrative embodiment, the first DMA server 116 may route a call originating at the first wireless communications device 122 via the LP network 114 to the DMAG 104 and the DMAG 104 may route the call via the third DMA server 120 to the fourth wireless communications device 128. For example, the DMAG 104 may route the call when the DMA server 120 is serviced by a second DMAG (not shown).

The DMA servers 116-120 also send and receive voice and data traffic from the wireless communication devices 122-128 to the legacy networks 102. For example, a call originating at the first wireless communications device 122 may be routed via the first DMA server 116 to the legacy networks 102 via the IP network 114 and via the DMAG 104.

In a conventional system, providing wireless access via a specific wireless protocol to wireless communications devices typically requires a base transceiver station (BTS), a base station controller (BSC) and a Mobile Switching Center (MSC). To provide wireless access via more than one wireless protocol typically requires a BTS, a BSC, and an MSC for each wireless protocol. Even when the functionality of the BTS, BSC, and MSC is integrated into a single unit, each unit only provides wireless access via a specific wireless protocol. For example, providing GSM, CDMA, and WiMAX typically requires the use of at least three units, with a first unit providing GSM access, a second unit providing CDMA access, and a third unit providing WiMAX access. In contrast, the system 100 allows a single integrated unit to provide wireless access via more than one wireless protocol. For example, a single integrated unit, such as the first DMA server 116 may provide wireless access via more than one wireless protocol, such as GSM, CDMA, UMTS, and WiMAX. Each of the DMA servers 116-420 can support additional wireless protocols by adding an appropriate transceiver. For example, the first DMA server 116 may provide CDMA evolution data optimized (EVDO) access by adding a transceiver capable of providing CDMA-EVDO.

Figure 2:
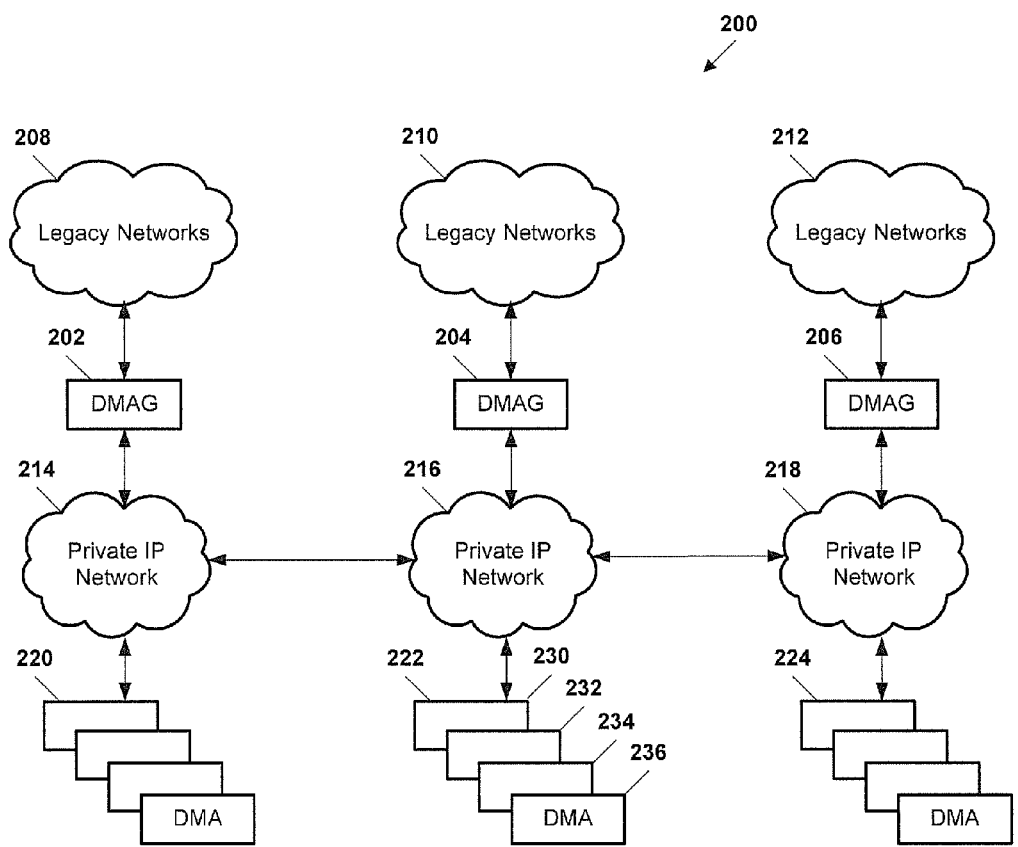
FIG. 2 is a block diagram of a second embodiment of a system to control wireless communications.

Referring to FIG. 2, a second embodiment of a system to control wireless communications is illustrated and generally designated 200. The system 200 includes distributed mobile architecture gateways (DMAGs) 202, 204, and 206. Each of the DMAGs 202-206 is coupled to one or more legacy networks. For example, the first DMAG 202 is coupled to one or more legacy networks 208, the second DMAG 204 is coupled to one or more legacy networks 210, and the third DMAG 206 is coupled to one or more legacy networks 212. Each of the legacy networks 208-212 may include one or more landline networks, one or more wireless networks, or any combination thereof, to carry voice traffic and/or data traffic to the DMAGs 202-206. Although the legacy networks 208-212 are shown as separate boxes, the legacy networks 208-212 may include one or more of the same legacy networks. Alternatively, each of the DMAGs 202-208 may serve as a backhaul to different legacy networks. To illustrate, the one or more legacy networks 208 may include legacy landline voice and data networks, the one or more legacy networks 210 may include a particular wireless voice and data network, such as a time division multiple access (TDMA) network, and the one or more legacy networks 212 may include another wireless voice and data network, such as a code division multiple access (CDMA) network.

Each of the DMAGs 202-206 may communicate via a private Internet Protocol (IP) network, such as the private IP networks 214-218. The DMAGs 202-206 may communicate with each other via the private IP networks 214-218, with one or more groups of distributed mobile architecture (DMA) servers 220-224, or any combination thereof. Although the private IP networks 214-218 are shown in FIG. 2 as separate networks, the private IP networks may represent either separate private IP networks or a single private IP network.

In a particular embodiment, the first DMAG 202 controls communications related to the first group of DMA servers 220 via the first private IP network 214. Additionally, the second DMAG 204 controls communications related to the second group of DMA servers 222 via the second private IP network 216 and the third DMAG 206 control communications related to the third group of DMA servers 224 via the third private IP network 218. Each of the DMA servers in a respective group of DMA servers may communicate with one or more wireless communication devices (not shown).

Each of the DMAGs 202-206 may control communications related to a respective group of DMA servers by routing voice traffic, data traffic, signaling, or any combination thereof, between the one or more legacy networks 208-212 and one or more wireless communication devices communicating with the respective groups of DMA servers 220-224. In an illustrative embodiment, the second DMAG 204 is adapted to control communications related to the second group of DMA servers 222. In FIG. 2, the second group of DMA servers includes DMA server 230, DMA server 232, DMA server 234, and DMA server 236. The second DMAG 204 may route voice traffic, data traffic, signaling, or any combination thereof, between the one or more legacy networks 210 and one or more wireless communication devices registered with the DMA servers 230-236 in the second group of DMA servers 222.

In an illustrative embodiment, each DMAG 202-206 may be specified by a communications service provider as a primary node to control voice traffic, data traffic, signaling, or any combination thereof, for designated DMA servers. For example, the second DMAG 204 may serve as a primary node to control voice traffic, data traffic, signaling, or any combination thereof, related to one or more of the DMA servers of the second group of DMA servers 222, such as the DMA servers 230-232. Additionally, the second DMAG 204 may control voice traffic, data traffic, signaling, or any combination thereof, related to one or more of the DMA servers of the second group of DMA servers 222 that have roamed into a coverage area associated with the second DMAG 204, such as the DMA servers 234-236.

Each DMA server of a particular group of DMA servers may be specified as a primary node for controlling communications related to one or more designated wireless communication devices. In addition, each DMA server of a particular group of DMA servers may be adapted to control communications related to one or more wireless communication devices that have roamed into a coverage area of a particular DMA server. Wireless communication devices may roam between DMA servers within a particular group of DMA servers and wireless communication devices may roam between DMA servers included in different groups of DMA servers. In one example, when the DMA server 230 serves as a primary node for a particular wireless communication device, the particular wireless communication device can roam from the coverage area of the DMA server 230 to a coverage area of the DMA server 232. In another example, when the DMA server 230 serves as a primary node for a particular wireless communication device, the particular wireless communication device can roam into a coverage area of a DMA server of the third group of DMA servers 224.

In an illustrative embodiment, a DMA server, such as the DMA server 230 may move from one group of DMA servers, such as the second group of DMA servers 222, to another group of DMA servers, while controlling communications related to one or more wireless communication devices in the coverage area of the DMA server 230. In an example, one or more wireless communications devices in the coverage area of the DMA server 230 when the DMA server 230 is included in the second group of DMA servers 222 may remain within the coverage area of the DMA server 230 by moving along with the DMA server 230 to the third group of DMA servers 224. Further, as the DMA server 230 moves to the third group of DMA servers 224, one or more additional wireless communication devices may register with the DMA server 230. In an illustrative, non-limiting embodiment, the second group of DMA servers 222 may be associated with a coverage area of the second DMAG 204 and the third group of DMA servers 224 may be associated with a coverage area of the third DMAG 206.

Each particular DMAG 202-206 may be adapted to route communications between wireless communication devices in coverage areas of different DMA servers of the respective group of DMA servers associated with the particular DMAG. Additionally, each DMAG 202-206 may be adapted to route communications between wireless communication devices in the coverage area of the same DMA server of the respective group of DMA servers associated with the particular DMAG. In one example, the second DMAG 204 may be adapted to route voice traffic, data traffic, or any combination thereof, between wireless communication devices in the coverage area of the DMA server 230 and wireless communication devices in the coverage area of the DMA server 232. In another example, the second DMAG 204 may be adapted to route voice traffic, data traffic, or any combination thereof, between wireless communication devices in the coverage area of the DMA server 230. Further, the DMAGs 202-206 may be adapted to control communications between wireless communication devices in the coverage area of a DMA server of one group of DMA servers and in the coverage area of another DMA server of a different group of DMA servers. To illustrate, the second DMAG 204 and the third DMAG 206 may be adapted to route voice traffic, data traffic, or any combination thereof, between a wireless communication device in the coverage area of the DMA server 230 and a wireless communication device in the coverage area of a DMA server of the third group of DMA servers 224.

In addition, each DMA server of a particular group of DMA servers may be adapted to route communications locally between wireless communication devices in the coverage area of the respective DMA server. For example, the DMA server 230 may be adapted to control voice traffic, data traffic, or any combination thereof, related to one or more wireless communication devices in the coverage area of the DMA server 230. Further, DMA servers included in a particular group of DMA servers may be adapted to route communications between wireless communication devices in the coverage areas of the DMA servers of the same group of DMA servers. To illustrate, the DMA server 230 and the DMA server 232 may be adapted to control voice traffic, data traffic, or any combination thereof, between wireless communication devices in the coverage area of the DMA server 230 and wireless communication devices in the coverage area of the DMA server 232. Additionally, DMA servers included in different groups of DMA servers may be adapted to route communications between wireless communication devices in coverage areas of the DMA servers included in the different groups. In an example, the DMA server 230 and a particular DMA server of the third group of DMA servers 224 may control voice traffic, data traffic, or any combination thereof, between wireless communication devices in the coverage area of the DMA server 230 and wireless communication devices in the coverage area of the particular DMA server included in the third group of DMA servers 224.

In the event of a failure of a particular DMAG, one or more DMAGs may control communications that would otherwise be controlled by the failed DMAG. In an illustrative embodiment, in the event of a failure of the second DMAG 204, the first DMAG 202, the third DMAG 206, or any combination thereof, may control communications related to the second group of DMA servers 222. For example, the first DMAG 202 and the third DMAG 206 may control voice traffic, data traffic, signaling, or any combination thereof, between the one or more legacy networks 210 and the wireless communication devices in the coverage areas the DMA servers 230-236.

Each of the DMAGs 202-206 may include redundant registration data with respect to each other, in order to assume control of communications in response to a failure in another one of the DMAGs 202-206. The registration data related to a particular DMAG may be redundantly stored in one or more additional DMAGs. In an illustrative, non-limiting embodiment, redundant registration data related to the second DMAG 204 may be stored at the first DMAG 202 and the third DMAG 206.

Registration data may identify that a particular DMAG is specified as the primary node to control communications related to certain DMA servers. In addition, registration data may identify a number of DMA servers that are roaming with respect to a particular DMAG. For example, registration data associated with the second DMAG 204 may identify that the second DMAG 204 is the primary node for the DMA servers 230-232 and that the DMA servers 234-236 are roaming with respect to the DMAG 204. Further, registration data may identify the wireless communication devices that are registered with the DMA servers included in a particular group of DMA servers. To illustrate, registration data associated with the second DMAG 204 may identify that the DMA server 230 is specified to serve as a primary node to control communications related to some wireless communication devices registered with the DMA server 230 and that other wireless communication devices registered with the DMA server 230 are roaming with respect to the DMA server 230. Registration data related to a particular wireless communication device may include an identifier, such as an international mobile subscriber identification (IMSI), associated with the particular wireless communication device. Additionally, the registration data may include further information related to an account associated with a particular wireless communication device.

Additionally, the DMA servers within a particular group of DMA servers may include redundant registration data needed to route communications in response to a failure of a DMA server in the particular group of DMA servers. In an illustrative embodiment, each DMA server of the second group of DMA servers 222 includes registration data identifying one or more wireless communication devices registered with one or more of the other DMA servers in the second group of DMA servers 222. For example, the DMA server 230 may include registration data identifying wireless communication devices in the coverage area of the DMA server 230 and registration data identifying wireless communication devices in the coverage area of the DMA server 232 and in the coverage area of the DMA server 234. Thus, the DMA server 230 can route voice traffic, data traffic, or any combination thereof, of wireless communication devices in the respective coverage areas of the DMA servers 232, 234, if the DMA server 232 and/or the DMA server 234 fails. To illustrate, if the DMA server 232 fails, the DMA server 230 can route communications between the second DMAG 204 and the wireless communication devices in the coverage area of the failed DMA server 232. Additionally, the DMA server 230 can route communications between wireless communication devices in the coverage area of the DMA server 232 at the time of failure. Further, the DMA server 230 can route communications between wireless communication devices in the coverage area of the DMA server 232 and wireless communication devices in the coverage area of other DMA servers of the system 200.

In some embodiments, a communications service provider may specify that one or more of the DMAGs 202-206 are adapted to route voice traffic, data traffic, and signaling related to wireless communication devices served by a particular group of DMA servers. In other embodiments, a communications service provider may specify that a particular DMAG is adapted to route voice and data traffic related to wireless communications devices served by a particular group of DMA servers, while another DMAG is adapted to handle the signaling related to communications associated with wireless communication devices registered with the particular group of DMA servers. In an example, the first DMAG 202 may be adapted to manage signaling related to communications associated with each group of DMA servers 220-224, while the second DMAG 204 and the third DMAG 206 are adapted to control voice traffic and data traffic related to communications associated with each group of DMA servers 220-224.

Figure 3:
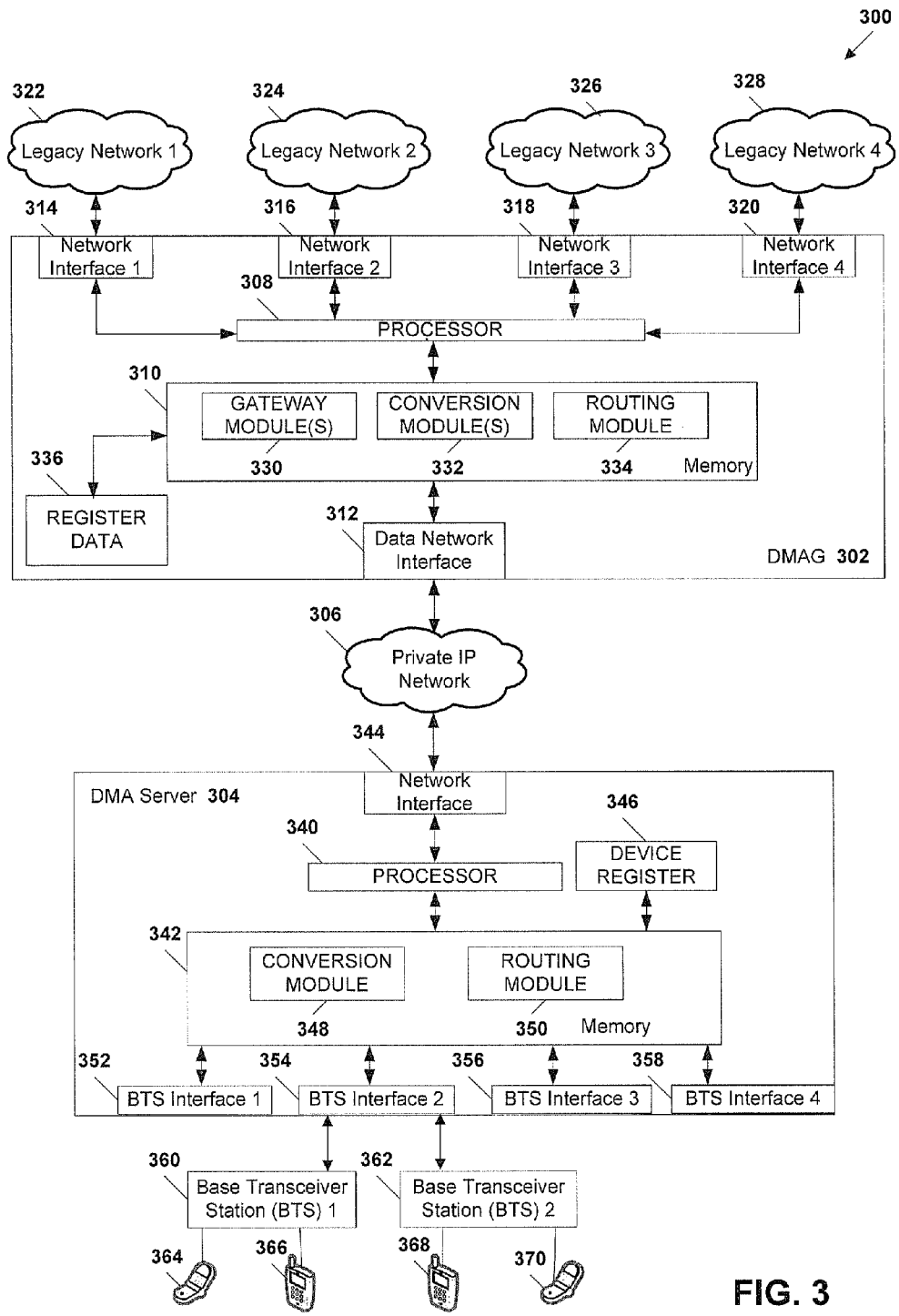
FIG. 3 is a block diagram of a third embodiment of a system to control wireless communications.

Referring to FIG. 3, a third embodiment of a system to control wireless communications is illustrated and is generally designated 300. The system 300 includes a distributed mobile architecture gateway (DMAG) 302 that communicates with a distributed mobile architecture (DMA) server 304 via a private Internet Protocol (IP) network 306. The DMAG 302 includes a processor 308, a memory 310, and a data network interface 312 coupled to the private IP network 306. Additionally, the DMAG 302 includes a first network interface 314, a second network interface 316, a third network interface 318, and a fourth network interface 320.

The first network interface 314 is adapted to communicate with a first legacy network 322. For example, the first legacy network 322 may be a landline voice network, such as a Public Switched Telephone Network (PSTN), an Integrated Services Digital Network (ISDN), other voice network or any combination thereof. The second network interface 316 is adapted to communicate with a second legacy network 324. For example, the second legacy network 324 may be a landline data network, such as a Digital Subscriber Line (DSL) network, a cable television network, fiber-optic network, other data network or any combination thereof. The third network interface 318 is adapted to communicate with a third legacy network 326. For example, the third legacy network 326 may be a wireless voice network, such as a Global System for Mobile Communications (GSM) network, a Code Division Multiple Access (CDMA) network, a Universal Mobile Telecommunications System (UMTS) network, other wireless protocol network, or any combination thereof. The fourth network interface 320 is adapted to communicate with a fourth legacy network 328. For example, the fourth legacy network 328 may be a wireless data network, such as a General Packet Radio Service (GPRS) network, an IEEE 802.16 network, a UNITS network, an evolution data optimized (EVDO) network, a one times Radio Transmission Technology (1XRTT) network, a High Speed Packet Access (HSPA) network, other data network, or any combination thereof.

Signaling received via the first network interface 314 from the first legacy network 322 may relate to Intelligent Network (IN) signaling, such as Signaling System 7 (SS7), and may include Integrated Services Digital Network User Part (ISUP) signaling, Message Transfer Part (MTP) signaling, Signaling Control Connection Part (SCCP) signaling, Transaction Capabilities Application Part (TCAP) signaling, Telephone User Part (TUP) signaling, Data User Part (DUP) signaling, other signaling protocol, or any combination thereof. Further, signaling received via the second network interface 316 from the second legacy network 324 may include session initiation protocol (SIP) signaling, H.323 signaling, or any combination thereof. Additionally, signaling received via the third network interface 318 from the third legacy network 326 may relate to IN signaling and may include mobile application part (MAP) protocol, American National Standards Institute (ANSI) 41 protocol, customized application of mobile enhanced logic (CAMEL), or any combination thereof. Signaling received via the fourth network interface 320 from the fourth legacy network 328 may include SIP signaling.

Although the first legacy network 322 and the second legacy network 324 are shown coupled to separate network interfaces 314 and 316, respectively, the first legacy network 322 and the second legacy network 324 may utilize the same infrastructure and may be coupled to a single interface. In an illustrative embodiment, the first legacy network 322 and the second legacy network 324 may be related to a telephone company communications network that carries voice traffic via a circuit-switched PSTN and data traffic via a packet switched network. The DMAG 302 may receive voice traffic and the data traffic from the telephone company communications network at a single interface that separates the voice traffic, the data traffic, signaling information, or any combination thereof.

Further, although the third legacy network 326 and the fourth legacy network 328 are shown coupled to separate network interfaces 318, 320, respectively, the third legacy network 326 and the fourth legacy network 328 may utilize the same infrastructure and may be coupled to a single interface. In an illustrative embodiment, the third legacy network 326 and the wireless data network may be related to a wireless communications provider network that carries voice traffic via a Global System for Mobile Communications (GSM) network and carries data traffic via a General Packet Radio Service (GPRS) network. The DMAG 302 may receive voice traffic and data traffic from the wireless communications provider network at a single interface that separates the voice traffic, the data traffic, signaling information, or any combination thereof.

The memory 310 includes one or more gateway modules 330, one or more conversion modules 332, and a routing module 334. In one embodiment, each of the modules 330-334 represents instructions that are executable by the processor 308, such as instructions embodied in one or more software programs stored at the memory 310. In another embodiment, the modules 330-334 represent hardware, software instructions, firmware instructions, logic instructions, or any combination thereof. The DMAG 302 also includes register data 336. The register data 336 may be stored at one or more data stores at the DMAG 302. An example of data stores storing the register data 336 are shown in FIG. 7. The register data 336 may include information, such as routing information and registration information, related to one or more DMA servers, such as the DMA server 304 that route voice and data traffic via the DMAG 304. Additionally, the register data 336 may include information related to other DMA servers that are served by other DMAGs. Further, the register data 336 may include information related to wireless communication devices registered with the DMA servers served by the DMAG 302, such as the wireless communication devices 360, 362, 364, and 366 registered and communicating with the DMA server 304. The register data 336 may also include information related to wireless communication devices related to other DMA servers served by other DMAGs.

The one or more gateway modules 330 may be adapted to distribute voice traffic, data traffic, signaling, or any combination thereof, communicated via the network interfaces 314-320. In a particular embodiment, each of the network interfaces 314-320 is associated with a respective gateway module 330. For example, a first gateway module may be adapted to communicate voice traffic, signaling, or any combination thereof, from the first network interface 314. The first gateway module may send voice traffic to a corresponding conversion module 332 and send signaling to the routing module 334. Additionally, a second gateway module may be adapted to communicate voice traffic, data traffic, signaling, or any combination thereof, from the second network interface 316. The second gateway module may send voice traffic and data traffic to a corresponding conversion module 332 and send signaling to the routing module 334. Further, a third gateway module may be adapted to communicate voice traffic, signaling, or any combination thereof, from the third network interface 318. The third gateway module may send the voice traffic to a corresponding conversion module 332 and send signaling to the routing module 334. The one or more gateway modules 330 may also include a fourth gateway module adapted to communicate voice traffic, data traffic, signaling, or any combination thereof, via the fourth network interface 320. The fourth gateway module may send voice traffic and data traffic to corresponding conversion modules 332 and send signaling to the routing module 334. Additionally, the one or more gateway modules 330 may be adapted to communicate voice traffic, data traffic, signaling, or any combination thereof, from the one or more conversion modules 332, the routing module 334, or both.

The one or more conversion modules 332 may be adapted to convert voice traffic, data traffic, or any combination thereof, communicated via the network interfaces 314-320 to Internet Protocol (IP) for transmission to a destination wireless communication device via the private IP network 306.

The representative DMA server 304 includes a processor 340, a memory 342, a network interface 344 coupled to the private IP network 306, and a device register 346. The memory 342 includes conversion module 348 and routing module 350. The DMA server 304 also includes representative BTS interfaces 352, 354, 356, and 358. The BTS interface 354 is adapted to communicate with first and second wireless communication devices 364 and 366 via a representative first base transceiver station (BTS) device 360. Additionally, the BTS interface 354 is adapted to communicate with wireless communication devices 368 and 370 via a representative second base transceiver station (BTS) device 362.

The network interface 344 is adapted to transmit data packets to the private IP network 306 and to receive data packets from the private IP network 306. The device register 346 is adapted to store registration information about the wireless communication devices 364-370 when the wireless communication devices 364-370 first enter the wireless coverage area of the BTS devices 360-362. The routing module 350 is adapted to route a call originating from or terminating at the wireless communication devices 364-370. The conversion module 348 is adapted to convert voice information from an originating call to data packets for transmission via the private IP network 306 and the DMAG 302 to the legacy networks 322-328. The BTS interfaces 352-358 are adapted to control one or more BTS devices. In FIG. 2, the second BTS interface 354 controls the BTS devices 360-362. The BTS devices 360-362 communicate signals to the wireless communication devices 364-370 via a wireless protocol, such as CDMA, GSM, and UMTS.

In operation, the DMA server 304 routes a call originating from the wireless communications device 360 via the private IP network 306 to another DMA server (not shown) or to the DMAG 302. When the first wireless communications device 360 originates a call, the BTS interface 348 notifies the routing module 354 that a call requires routing. The routing module 354 determines a route for the call based on the destination address of the call. The conversion module 350 converts the call information to data packets and sends the data packets via the network interface 344 to the private IP network 306 via the network interface 344. The private IP network 306 then routes the data packets to another DMA server (not shown) or to the DMAG 302.

The DMAG 302 communicates the data packets via the data network interface 312. The conversion module(s) 330 may convert the data packets from one format to another format based on the characteristics of the legacy networks 322-328. For example, the conversion module 332 may convert the data packets to an analog format when the destination legacy network is a landline voice network. The routing module 334 routes the data packets to one of the legacy networks 322-328 via the network interfaces 314-320.

When a call originates from one of the legacy networks 322-328, the call is communicated to one of the network interfaces 314-320. The conversion module(s) 332 converts the voice or data call to data packets. The routing module 334 determines a route for the data packets based on the destination address of the call and communicates the data packets to the data network interface 312. The data network interface 312 communicates the packets to the DMA server 304 via the private IP network 306.

The DMA server 304 receives the data packets from the private IP network 306 via the network interface 306. The routing module 350 determines which of the BTS devices 360-362 serves the destination wireless communications device. The data packets are communicated to one of the BTS devices 360-362. For example, when the data packets are destined for wireless communications device 370, the data packets are communicated via the second BTS interface 352 to the second BTS device 362 and from the second BTS device to the wireless communications device 370.

Figure 4:
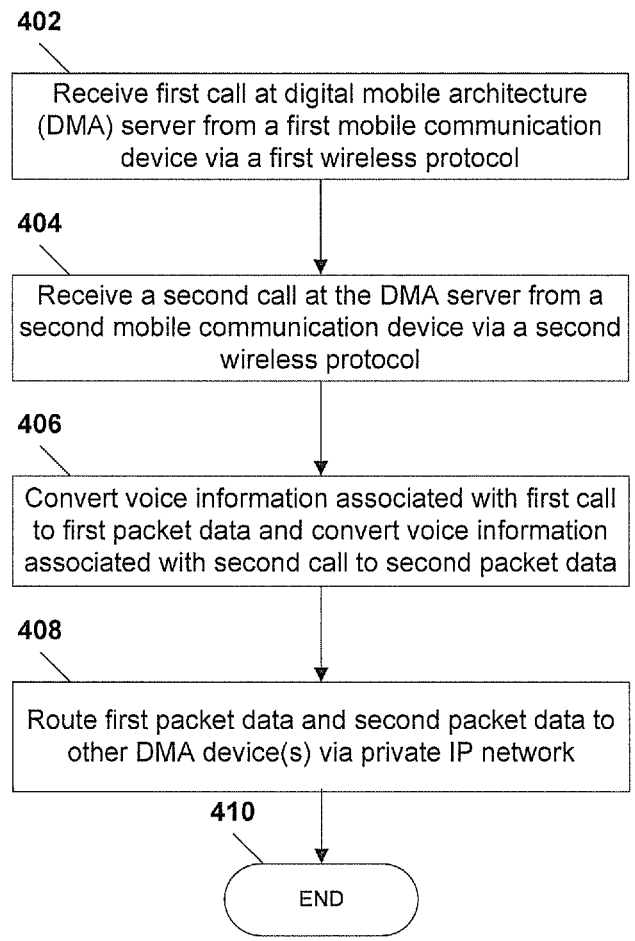
FIG. 4 is a flow diagram of a first method of controlling wireless communications.

Referring to FIG. 4, a flow diagram is provided to illustrate a first method of controlling wireless communications. The method may be performed by a module at a distributed mobile architecture device, such as the DMA 304 in FIG. 3. At 402, a first call is received at a DMA server from a first mobile communication device via a first wireless communication protocol. Moving to 404, a second call is received at the DMA server from a second mobile communication device via a second wireless communication protocol. The first and second wireless communication protocols may be one or more of the GSM protocol, the CDMA protocol, the UMTS protocol, the WiMAX protocol, other wireless protocol, or any combination thereof. Proceeding to 406, voice information associated with the first call is converted to first packet data and the voice information associated with the second call is converted to second packet data. The first and second packet data may be in one or more of Frame Relay, Asynchronous Transfer Mode (ATM), IP, other packet format, or any combination thereof. Advancing to 408, the first packet data and the second packet data are routed via a private Internet Protocol (IP) network to at least one other DMA device, where the first call is accessible to a first destination device and the second call is accessible to a second destination device via the other DMA device(s). In one illustrative embodiment, the other DMA device may include a second DMA server. In a second illustrative embodiment, the other DMA device may include a DMAG. The method ends at 410.

For example, in FIG. 3, when the DMA server 304 receives a first call from the first wireless communications device 364 and a second call from the third wireless communications device 368, the conversion module 348 converts the voice information associated with the first call to first packet data and converts the voice information associated with the second call to second packet data. The routing module 350 routes the first packet data and the second packet data via the private IP network 306 to another DMA device, such as another DMA server or a DMAG.

Figure 5:
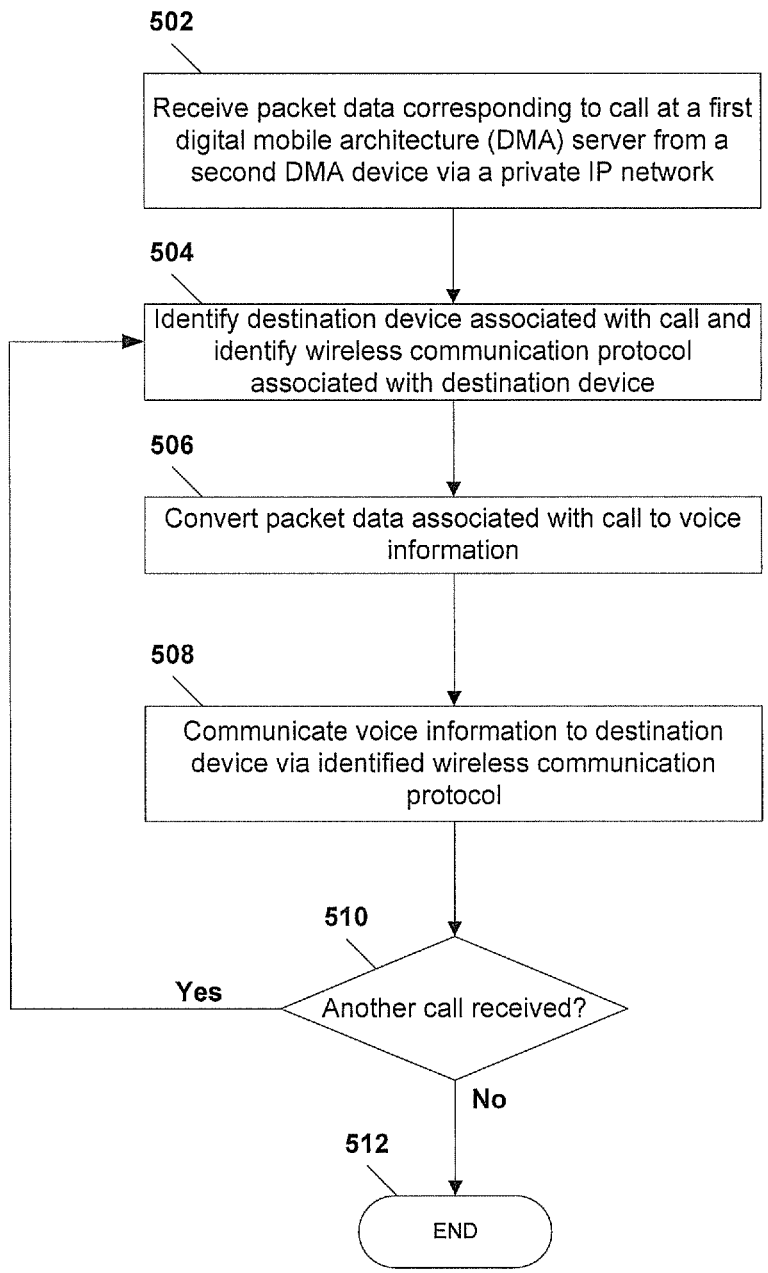
FIG. 5 is a flow diagram of a second method of controlling wireless communications.

Referring to FIG. 5, a flow diagram is provided to illustrate a second method of controlling wireless communications. The method may be performed by a module at a distributed mobile architecture device, such as the DMA 304 in FIG. 3. At 502, packet data corresponding to a call at a first digital mobile architecture (DMA) server is received from a second DMA device via a private IP network. Moving to 504, a destination device for the call is identified and a first wireless communication protocol associated with the destination device is identified. The first DMA server communicates with a plurality of mobile communication devices via a plurality of wireless communication protocols. Continuing to 506, the packet data associated with the call is converted to voice information. For example, a digital-to-analog converter may be used to convert the packet data to voice information. Advancing to 508, the voice information is communicated to the destination device via the identified wireless communication protocol. At 510, if another call is received, then the method repeats steps 504-508. If at 510, another call is not received then the method ends at 512.

For example, in FIG. 1, when the third DMA server 120 receives packet data corresponding to a call at the first DMA server 116 via the IP network 114, the third DMA server 120 identifies that the call is destined for the fourth wireless communications device 128. The third DMA server 120 identifies that the fourth wireless communications device 128 is associated with the UMTS wireless protocol. The third DMA server 120 converts the packet data associated with the call to voice information and communicates the voice information to the fourth wireless communications device 128 via the UMTS wireless protocol.

Figure 6:
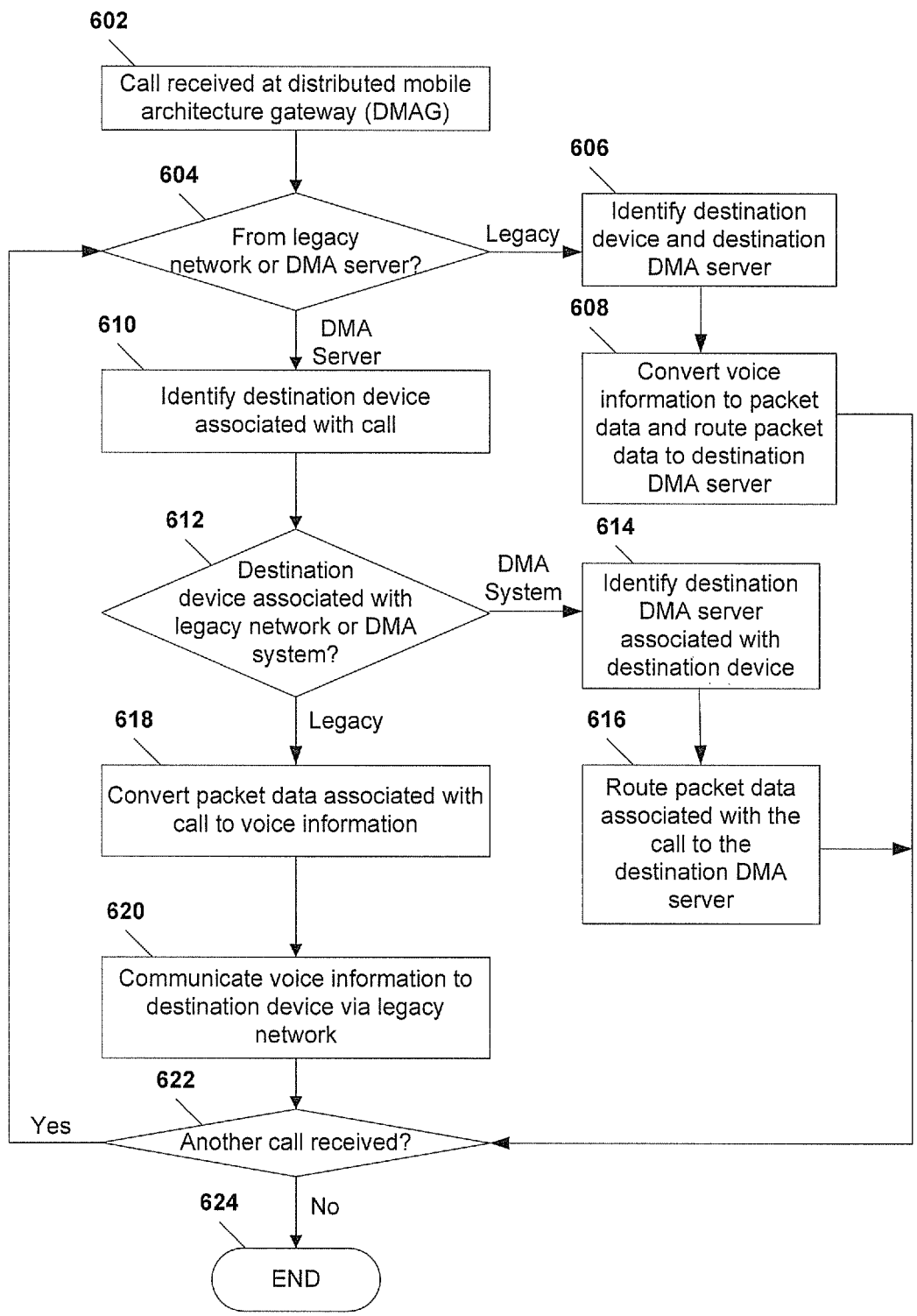
FIG. 6 is a flow diagram of a third method of controlling wireless communications.

Referring to FIG. 6, a flow diagram is provided to illustrate a third method of controlling wireless communications. The method may be performed by a module at a distributed mobile architecture device, such as the DMAG 302 in FIG. 3. At 602, a call is received at a distributed mobile architecture gateway (DMAG). At 604, if the call is from a legacy network, then the method proceeds to 606. At 606, the destination device and destination DMA server are identified. Continuing to 608, voice information from the call is converted to packet data and the packet data is routed to the destination DMA server. Advancing to 622, if another call is not received, then the method ends at 624.

At 604, if the call is not from a legacy network, then the method proceeds to 610. At 610 a destination device associated with the call is identified. Moving to 612, if the destination device is associated with a DMA system then the method proceeds to 614. At 614, the destination DMA server associated with the destination device is identified. Advancing to 616, packet data associated with the call is routed to the destination DMA server. Continuing to 622, if another call is not received, then the method ends at 624.

At 612, if the destination device is associated with a legacy network, then the method proceeds to 618. Continuing to 618 the packet data associated with the call is converted to voice information. Proceeding to 620, the voice information is communicated to the destination device via the legacy network. Advancing to 622, if another call is received, then the method proceeds back to 604. At 622, if another call is not received, then the method ends at 624.

For example, in FIG. 3, when the DMAG 302 receives a call, the gateway module 334 determines whether the call is from one of the legacy networks 322-328 or from the DMA server 304. When the call is from one of the legacy networks 322-328, the conversion module(s) 332 convert the voice information to packet data and route the packet data to the DMA server 304 via the private IP network 306. When the call is from the DMA server 304, the routing module 334 identifies the destination device associated with the call. If the destination device is associated with one of the legacy networks 322-328, then the conversion module(s) 332 convert the packet data associated with the call to voice information and communicate the voice information to the destination device via one of the legacy networks 322-328. If the destination device is associated with the DMA server 304, then the routing module 334 identifies the DMA server 304 as associated with the destination device and routes the packet data to the destination server 304 via the private 1P network 306.

FIG. 7 is an illustrative embodiment of data associated with a DMAG, in accordance with FIG. 2. More specifically, the table 700 illustrates the different databases of data that may be utilized by the DMAGs of FIG. 2 to provide switching or connection of calls between the legacy networks and the DMA servers of FIG. 2. The data shown in FIG. 7 may increase or decrease based on the size of the DMA network 200 in FIG. 2. The table 700 illustrates different databases 708, 710, 712, 714, 716, and 718 each including tables for a home DMAG 702, a second DMAG 704, and third DMAG 706, corresponding to DMAG 202, DMAG 204, and DMAG 206 in FIG. 2. The home DMAG 702 is also known as the first DMAG 702.

The DMA server register database 708 includes a home DMA server register that identifies the DMA servers which are associated with the first DMAG 702. For example, the DMA server register database 708 may identify the first group of DMA servers 220 as associated with the first DMAG 202, identify the second group of DMA servers 222 as associated with the second DMAG 204, and identify the third group of DMA servers 224 as associated with the third DMAG 206. In an illustrative embodiment, the DMA server register is implemented as a database.

The DMA server HLR database 710 includes the home location register for each of the home DMAG 702, the second DMAG 704, and the third DMAG 706. Each home location register of the DMA server HLR database 710 includes calling information for the home mobile stations that are associated respectively with the DMAGs 702-706.

The DMA server VLR database 712 includes the visitor location registers for the DMAGs 702-706. Each visitor location register of the DMA server HLR database 712 includes calling information for the visitor mobile stations that are associated respectively with the home DMAG 702, the second DMAG 704, and the third DMAG 706.

The visitor DMA server register database 714 includes a visitor DMA server register that identifies visitor DMA servers associated with the home DMAG 702, a visitor DMA server register of the second DMAG 704 identifies visitor DMA servers associated with the second DMAG 704, and a DMA server register of the third DMAG 706 identifies visitor DMA servers associated with the third DMAG 706.

The visitor DMA server HLR database 716 includes the home location register for each visitor DMA server of the home DMAG 702, the second DMAG 704, and the third DMAG 706. The home location register includes calling information for the mobile stations of each visitor DMA server that are associated respectively with the first DMAG 702, the second DMAG 704, and the third DMAG 706.

The visitor DMA server VLR database 718 includes a visitor location register for each visitor DMA server of the home DMAG 702, the second DMAG 704, and the third DMAG 706. Each visitor location register includes calling information for the visitor mobile stations of each visitor DMA server that are associated respectively with the home DMAG 702, the second DMAG 704, and the third DMAG 706.

The table 720 illustrates the different databases of data that may be utilized by the DMAGs of FIG. 2 to provide switching or connection of calls between the legacy networks and the DMA servers of FIG. 2. The table 720 illustrates different databases 728, 730, 732, 734, 736, and 738 each including tables for home DMAG 722, first DMAG 724, and third DMAG 726. In table 720, the home DMAG 722 is the second DMAG.

The DMA server register database 728 includes a home DMA server register that identifies the DMA servers which are associated with the home DMAG 722. For example, the DMA server register database 728 may identify the first group of DMA servers 220 in FIG. 2 as associated with the first DMAG 202, identify the second group of DMA servers 222 as associated with the second DMAG 204, and identify the third group of DMA servers 224 as associated with the third DMAG 206. In an illustrative embodiment, the DMA server register is implemented as a database.

The DMA server HLR database 730 includes the home location register for each of the DMAGs 722-726. Each home location register of the DMA server HLR database 730 includes calling information for the home mobile stations that are associated respectively with the DMAGs 722-726.

The DMA server VLR database 732 includes the visitor location registers for the DMAGs 732-736. Each visitor location register of the DMA server HLR database 732 includes calling information for the visitor mobile stations that are associated respectively with the home (i.e. second) DMAG 722, the first DMAG 724, and the third DMAG 726.

The visitor DMA server register database 734 includes a visitor DMA server register that identifies visitor DMA servers associated with the first DMAG 722, a visitor DMA server register of the home DMAG 724 identifies visitor DMA servers associated with the second DMAG 724, and a DMA server register of the third. DMAG 726 identifies visitor DMA servers associated with the third DMAG 726.

The visitor DMA server HLR database 736 includes the home location register for each visitor DMA server of the home DMAG 722, the first DMAG 724, and the third DMAG 726. The home location register includes calling information for the mobile stations of each visitor DMA server that are associated respectively with the home DMAG 722, the first DMAG 724, and the third DMAG 726.

The visitor DMA server VLR database 738 includes a visitor location register for each visitor DMA server of the home DMAG 722, the first DMAG 724, and the third DMAG 726. Each visitor location register includes calling information for the visitor mobile stations of each visitor DMA server that are associated respectively with the home DMAG 722, the first DMAG 724, and the third DMAG 726.

With the configuration of structure described above, the present disclosure provides a system and method of controlling communications through use of a flexible telecommunications device, i.e., the DMA server 304 (FIG. 3), that is distributive and associative, i.e., it can operate stand-alone or seamlessly within an existing cellular or other network. Moreover, the DMA server 304 can be integrated with virtually any third party base station. The DMA server 304 can operate with multiple air interfaces including CDMA IS-95, CDMA 1X, CDMA EVDO, GSM, GPRS, W-CDMA, 802.11 (Wi-fi), 802.16 (Wi-fi), etc. Further, the DMA server 304 can provide integrated prepaid billing, OAMP, network management, and AAA functionality. The DMA server 304 can include a Java based user interface and feature configuration system. Also, the DMA server 304 can provide real time call metering, call detail record (CDR) generation, and real time call provisioning. The DMA server 304 may be implemented in a relatively small footprint and has a relatively low power requirement. Further, the DMA server 304 may be implemented using inexpensive and widely available computer equipment.

With one or more of the deployment configurations described above, the present system provides mobile to land-line calls from mobile handsets within a DMA server wireless coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA server coverage area. IP to IP calls can be made from any DMA handset to any IP phone. Additionally, IP to landline calls and landline to IP calls can be made from a DMA handset to any phone. Further, land-line to mobile calls to DMA handsets can be made.

The systems described above may be adapted to provide various data and telephony features by deploying appropriate software and/or hardware. For example, the systems described above may be adapted to provide call forwarding, call waiting, 3-way calling, caller ID, voice mail, and mobile to mobile SMS service, i.e., text messaging. Further, the systems described above may be adapted to provide broadcast SMS service, mobile to land high-speed IP data (1X or GPRS) service and mobile-to-mobile high speed IP data (1X or GPRS) service. Also, the systems described above may be adapted to provide IP-PBX capability.

Further, one or more of the illustrated systems can provide IP transport between distributed elements, e.g., DMA servers 304 (FIG. 3). Further, the control logic within the DMA server (FIG. 3) can be distributed and associated. Associated systems can be redundant, self-healing, self-organizing, and scalable. Distributed systems can be "snap-together," i.e., a DMA server (FIG. 3) can be linked to a previously deployed DMA server (FIG. 3) in order to broaden, or otherwise extend coverage. Further, distributed systems can be de-centralized to avoid single points of failure.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving a first call from a first mobile device at a first base transceiver station (BTS) interface of a first distributed mobile architecture (DMA) server, wherein the first call is associated with a destination device;
determining that a first distributed mobile architecture gateway (DMAG) supports communication with the destination device based on registration data stored at the first DMA server, wherein the registration data indicates that the destination device is not within a wireless coverage area associated with the first DMA server, and wherein the first DMAG is communicatively coupled to a plurality of DMA servers including the first DMA server;
converting first voice information associated with the first call to first packet data; and
routing the first packet data to the destination device via the first DMAG.

2. The method of claim 1, further comprising:
receiving a second call from a second mobile device at a second BTS interface of the first DMA server, wherein the second call is associated with a third mobile device;
determining that the first DMA server supports communication with the third mobile device based on the registration data, wherein the registration data indicates that the third mobile device is within the wireless coverage area;
converting second voice information associated with the second call to second packet data; and
routing the second packet data to the third mobile device via a third BTS interface.

3. The method of claim 1, further comprising:
in response to a second DMA failing, receiving a second call from a second mobile device that is associated with the second DMA, wherein the second call is associated with a second destination device;
determining that the first DMAG supports communication with the second destination device based on the registration data, wherein the registration data indicates that the second destination device is not within the wireless coverage area;
converting second voice information associated with the second call to second packet data; and
routing the second packet data to the second destination device via the first DMAG.

4. The method of claim 1, wherein the first call uses a first wireless communication protocol and further comprising:
receiving a second call from a second mobile device at a second BTS interface of the first DMA server, wherein the second call uses a second wireless communication protocol that is different from the first wireless communication protocol, and wherein the second call is associated with the destination device;
converting second voice information associated with the second call to second packet data; and
routing the second packet data to the destination device via the first DMAG.

5. The method of claim 4, wherein the first wireless communication protocol is a Universal Mobile Telecommunications System protocol, and wherein the second wireless communication protocol is a Worldwide Interoperability for Microwave Access protocol.

6. The method of claim 1, wherein the first DMAG is in communication with a plurality of legacy communication networks.

7. The method of claim 1, wherein the first DMA server is configured to receive one or more calls while the first DMA server is moving.

8. The method of claim 7, wherein the first DMA server is located within a first coverage area associated with the first DMAG when the first call is received.

9. The method of claim 8, further comprising:
converting additional voice information associated with the call to additional packet data;
in response to determining that the first DMA server has moved into a second coverage area associated with a second DMAG, determining that the second DMAG supports communication with the destination device; and
routing the additional packet data to the destination device via the second DMAG.

10. A method, comprising:
receiving a call from a communication device at a distributed mobile architecture gateway (DMAG) via a network, wherein the call is associated with a destination device, wherein the call is routed to the DMAG from a first distributed mobile architecture (DMA) server in response to the first DMA server determining that the DMAG supports communication with the destination device based on first registration data stored at the first DMA server, wherein the first registration data indicates that the destination device is not within a first wireless coverage area associated with the first DMA server;
determining that a second DMA server supports wireless communication with the destination device based on second registration data stored at the DMAG, wherein the DMAG is communicatively coupled to a plurality of DMA servers including the first DMA server and the second DMA server;
converting information associated with the call to packet data; and
routing the packet data to the destination device via the second DMA server.

11. The method of claim 10, further comprising:
in response to a second DMAG failing, receiving a second call from a second communication device, wherein the second call is associated with a second destination device, and wherein the second communication device is associated with the second DMAG;
determining that a third DMA supports wireless communication with the second destination device based on the second registration data;
converting second voice information associated with the second call to second packet data; and
routing the second packet data to the second destination device via the first DMAG.

12. The method of claim 10, wherein the second registration data indicates that the DMAG is a node that controls communications related to the first DMA server and that a second DMAG controls communications related to a third DMA server.

13. The method of claim 10, wherein the second registration data stored at the DMAG indicates that the second DMA server is associated with a second wireless coverage area, and wherein the second registration data indicates that the destination device is within the second wireless coverage area.

14. The method of claim 13, further comprising:
in response to determining that the destination device has moved from the second wireless coverage area into a third wireless coverage area associated with a third DMA server, determining that the third DMA server supports communication with the destination device based on the second registration data stored at the DMAG; and
routing additional packet data to the destination device via the third DMA server.

15. A non-transitory computer-readable storage medium, comprising instructions, that when executed by a processor, cause the processor to:
receive a call from a communication device at a distributed mobile architecture gateway (DMAG) via a network, wherein the call is associated with a destination device, wherein the call is routed to the DMAG from a first distributed mobile architecture (DMA) server in response to the first DMA server determining that the DMAG supports communication with the destination device based on first registration data stored at the first DMA server, wherein the first registration data indicates that the destination device is not within a first wireless coverage area associated with the first DMA server;
determine that a second DMA server supports communication with the destination device based on second registration data stored at the DMAG, wherein the DMAG is communicatively coupled to a plurality of DMA servers including the first DMA server and the second DMA server; and
convert information associated with the call to packet data to be routed to the destination device via the second DMA server.

16. The non-transitory computer-readable storage medium of claim 15, wherein the instructions further cause the processor to receive a second call at the DMAG from a third DMA server, wherein the call uses a first wireless communication protocol, and wherein the second call uses a second wireless communication protocol that is different from the first wireless communication protocol.

17. The non-transitory computer-readable storage medium of claim 16, wherein the instructions further cause the processor to determine that a legacy network supports communication with a second destination device associated with the second call based on the second registration data.

18. The non-transitory computer-readable storage medium of claim 17, wherein-the instructions further cause the processor to convert second information associated with the second call to second packet data to be routed to the second destination device via the legacy network.

19. The non-transitory computer-readable storage medium of claim 15, wherein the DMAG supports communication with the network via a first network interface.

20. The non-transitory computer-readable storage medium of claim 19, wherein the DMAG supports communication with at least one additional network via at least one additional network interface.

* * * * *